UNITED STATES PATENT OFFICE.

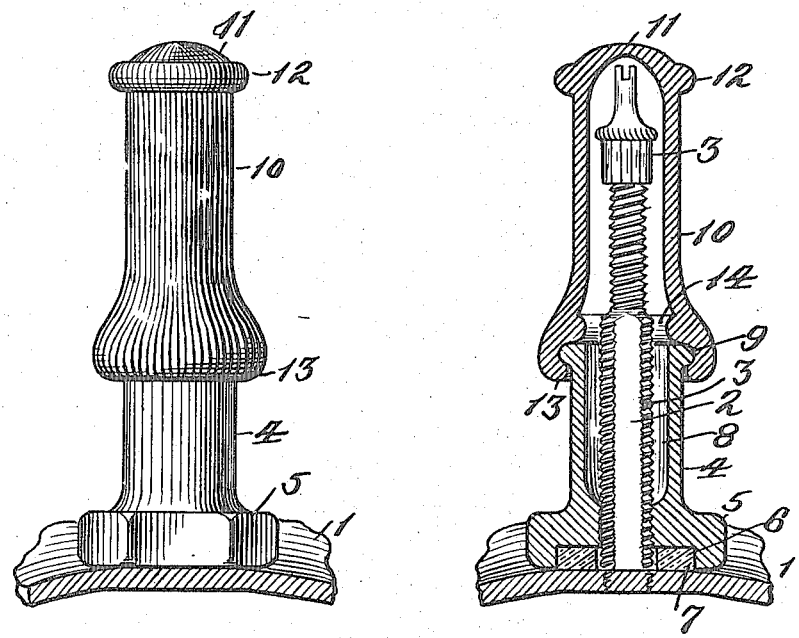

GEORGE M. STADELMAN, OF AKRON, OHIO, ASSIGNOR TO THE GOODYEAR TIRE & RUBBER COMPANY, OF AKRON, OHIO, A CORPORATION OF OHIO.

VALVE-STEM-PROTECTIVE DEVICE.

1,141,219.  Specification of Letters Patent.  Patented June 1, 1915.

Application filed January 15, 1915. Serial No. 2,417.

*To all whom it may concern:*

Be it known that I, GEORGE M. STADELMAN, a citizen of the United States, residing at Akron, in the county of Summit and State of Ohio, have invented new and useful Improvements in Valve-Stem-Protective Devices, of which the following is a specification.

This invention relates to improvements in protective caps or inclosing means for the inflating tubes of pneumatic tires, and the object thereof is to provide a suitable device for the purpose described which will effectually seal the joint around the inflated tube from dust, dirt, moisture and the like, and which can be applied much more readily than the protective cap now employed, which will not wear loose, or wear the threads in the valve stem to cause unpleasant rattling while in use, and finally, one of great ease in placement and cheapness in construction.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a view in side elevation of this invention; and, Fig. 2, is a vertical, central, sectional view of the same.

Referring to the drawings, the reference numeral 1 denotes so much of a vehicle rim equipped with a pneumatic tire as is necessary to show the adaptability of this invention and through which extends the valve-stem 2 provided with the usual closure cap 3. The valve-stem 2 is preferably rectangular in outline with threads 3 provided at the rounded corners thereof and onto these threads is screwed a sleeve-like member 4 provided at its outer lower end with a head 5 provided with a recess 6 in which is a packing ring or washer 7. The inner portion of the opposite end of this sleeve is chambered out to provide a recess 8 so that only a limited amount of threaded surface for engagement with the valve-stem 2 is provided. The chambered end of the sleeve is provided exteriorly with an enlarged bead 9.

Coöperating with the sleeve 4 is a tubular closure member 10 the inner end 11 whereof is closed and stiffened, if necessary, by a circumferential bead 12. The opposite and open end is turned outwardly-flared and provided with an interior bead 13 adapted to be sprung over the bead 9 and frictionally hold the member 10 in position. The member 10 may be further stiffened by an interiorly placed bead 14 which coöperates with the bead 13 to provide a channel for the reception of the bead 9 on the sleeve 4. The member 10 is preferably constructed of vulcanized rubber, but any other elastic or resilient substance may be employed. When it is desired to use the valve-stem the member 10 is easily stripped of the sleeve 4 and the tire inflated or deflated in the usual manner. The engagement of the washer-carrying head 5 with the felly 1 serves to close the joint around the valve stem 2 to prevent the entrance of dirt, moisture, dust and the like.

It is obvious that as long as the member 10 maintains its form a perfect hermetically sealed union with the member 4 is obtained and the bead of soft resilient material is incapable of rattling or working loose or accidently detaching itself from the sleeve 4. Furthermore, the rubber member 10 constitutes a cushion for the shank end of the valve stem 2 when the inner tube is packed for shipment, which now, under normal circumstances, is dangerous to soft and delicate tubes when the latter are packed in cartons for the market.

I claim:—

A valve stem protective device comprising a rigid sleeve threaded on the valve stem and provided at one end with an annular exteriorly-placed bead, and a rubber cap having a wall around its open end inwardly-converging, said cap further provided with an annular inwardly-projecting bead spaced from the converging open end to provide between said converging portion and said bead a bead-receiving groove to receive the bead on the sleeve.

In testimony whereof I have hereunto set my hand in presence of two subscribing witnesses.

GEORGE M. STADELMAN.

Witnesses:
E. M. CHAMBERS,
A. N. JOHNSON.